(12) United States Patent
Bologna

(10) Patent No.: US 8,739,655 B2
(45) Date of Patent: Jun. 3, 2014

(54) ELECTRIC PROPULSION SYSTEM FOR VEHICLES

(75) Inventor: Simone Bologna, Rivoli (IT)

(73) Assignee: Oerlikon Graziano S.p.A., Rivoli, Turin (IT)

( * ) Notice: Subject to any disclaimer, the term of this patent is extended or adjusted under 35 U.S.C. 154(b) by 197 days.

(21) Appl. No.: 13/485,439

(22) Filed: May 31, 2012

(65) Prior Publication Data

US 2012/0304790 A1 Dec. 6, 2012

(30) Foreign Application Priority Data

Jun. 3, 2011 (IT) .................................. TO11A0483

(51) Int. Cl.
*F16H 37/08* (2006.01)
(52) U.S. Cl.
USPC .......................................... 74/661; 74/665 D
(58) Field of Classification Search
USPC ............ 74/661, 665 A, 665 B, 665 C, 665 D, 74/665 E
See application file for complete search history.

(56) References Cited

U.S. PATENT DOCUMENTS

| | | | | |
|---|---|---|---|---|
| 5,214,972 A | * | 6/1993 | Larson et al. ................. | 74/89.26 |
| 7,028,583 B2 | * | 4/2006 | Bennett ........................... | 74/661 |
| 7,803,085 B2 | * | 9/2010 | Himmelmann ................... | 477/2 |

FOREIGN PATENT DOCUMENTS

| | | |
|---|---|---|
| DE | 43 05 055 A1 | 8/1994 |
| DE | 198 31 069 A1 | 1/2000 |
| DE | 199 17 724 A1 | 11/2000 |
| DE | 101 11 137 A1 | 9/2002 |
| DE | 10 2006 028790 A1 | 1/2008 |
| WO | WO 2007/033739 A2 | 3/2007 |

OTHER PUBLICATIONS

Italian Search Report for corresponding Italian Patent Application No. TO2011A000483 mailed Sep. 29, 2011.
Extended European Search Report for corresponding European Patent Application No. 12170744.2 mailed Jul. 9, 2012.

* cited by examiner

*Primary Examiner* — Ha D Ho
(74) *Attorney, Agent, or Firm* — Merchant & Gould P.C.

(57) ABSTRACT

A propulsion system includes two electric motors, a gearbox with at least three forward gears and a control unit to control the electric motors and the engagement of the gears. The gearbox includes two primary shafts, one associated to with the odd gears and the other with the even gears and are permanently connected each to a respective electric motor. The control unit controls the two electric motors and the engagement of the gears of the gearbox to provide at least a first operating mode in which the first gear and the second gear are engaged at the same time and a second operating mode in which the second gear and the third gear are engaged at the same time. In each of these operating modes the torque being transmitted by both the electric motors.

7 Claims, 3 Drawing Sheets

ELECTRIC PROPULSION SYSTEM FOR VEHICLES

BACKGROUND OF THE INVENTION

This application claims benefit of Ser. No. TO2011A000483, filed 3 Jun. 2011 in Italy and which application is incorporated herein by reference. To the extent appropriate, a claim of priority is made to the above disclosed application.

The present invention relates to an electric propulsion system for vehicles, comprising a first and a second electric motor, a gearbox with at least three forward gears and control means arranged to control the first and the second electric motor and to control the engagement of the gears of the gearbox.

An electric propulsion system for vehicles of the above-identified type is known from DE-A-101 11 137.

SUMMARY OF THE INVENTION

It is an object of the present invention to provide an electric propulsion system for vehicles which makes more forward gears available and which enables to shift from one gear to the other with one gear being always engaged and hence with no interruption in the transmission of the torque.

This and other objects are fully achieved according to the present invention by virtue of an electric propulsion system of the above-mentioned type, wherein the gearbox comprises a first primary shaft which is associated to the odd gears and is permanently torsionally connected to the first electric motor and a second primary shaft which is associated to the even gear(s) and is permanently torsionally connected to the second electric motor, and wherein the control means are arranged to control the first and the second electric motor and to control the engagement of the gears of the gearbox so as to provide at least a first operating mode in which the first gear and the second gear are engaged at the same time and a second operating mode in which the second gear and the third gear are engaged at the same time, in each of these operating modes the torque being transmitted both by the first electric motor and the second electric motor through the first primary shaft and the second primary shaft, respectively.

By virtue of the two electric motors being permanently torsionally connected each to a respective primary shaft of the gearbox, the electric propulsion system according to the invention has the advantage of not requiring the use of friction clutches and of having the two gear sets associated to the aforesaid two adjacent gears always engaged and always transmitting torque.

BRIEF DESCRIPTION OF THE DRAWINGS

Further features and advantages of the present invention will appear from the following detailed description, given purely by way of non-limiting example with reference to the appended drawings, in which.

DETAILED DESCRIPTION OF THE PREFERRED EMBODIMENTS

Figure 1:
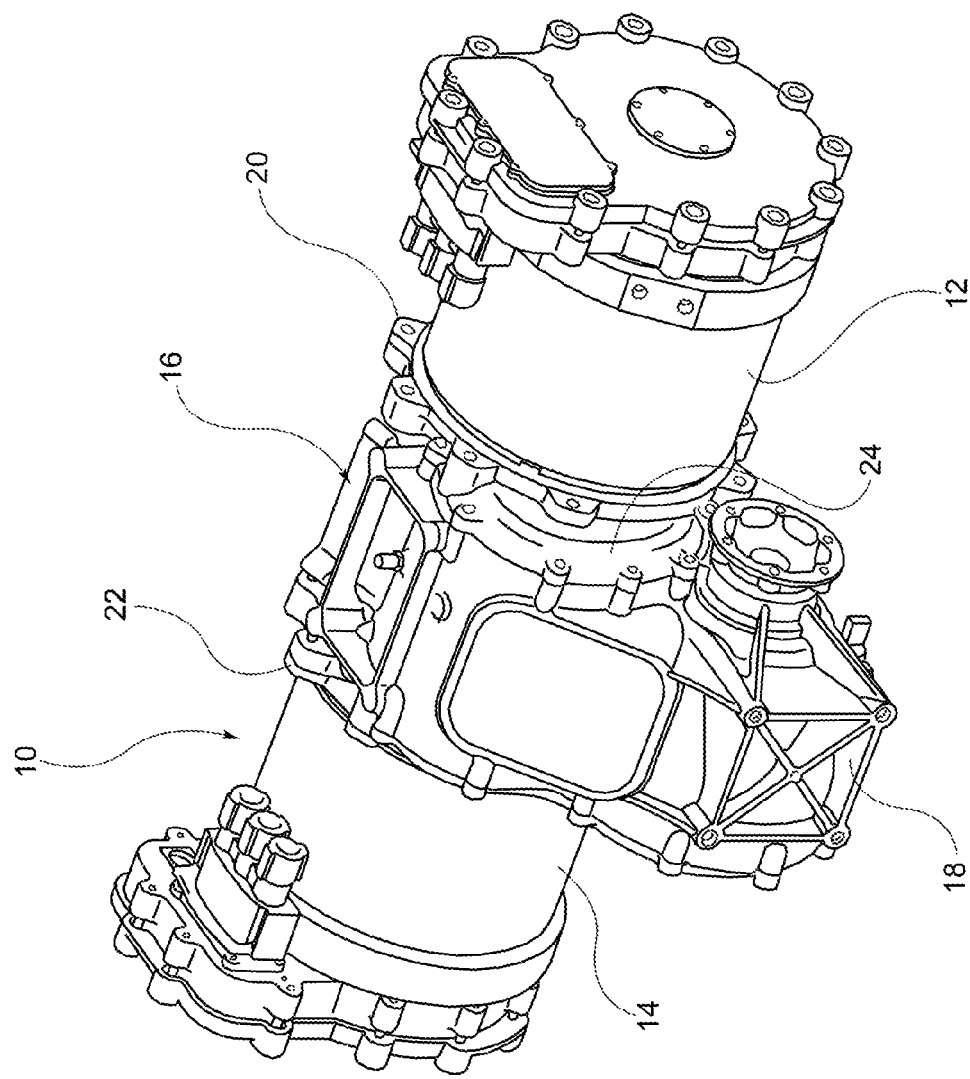
FIG. 1 is a perspective view of an electric propulsion system for vehicles according to a preferred embodiment of the present invention.
Figure 2:
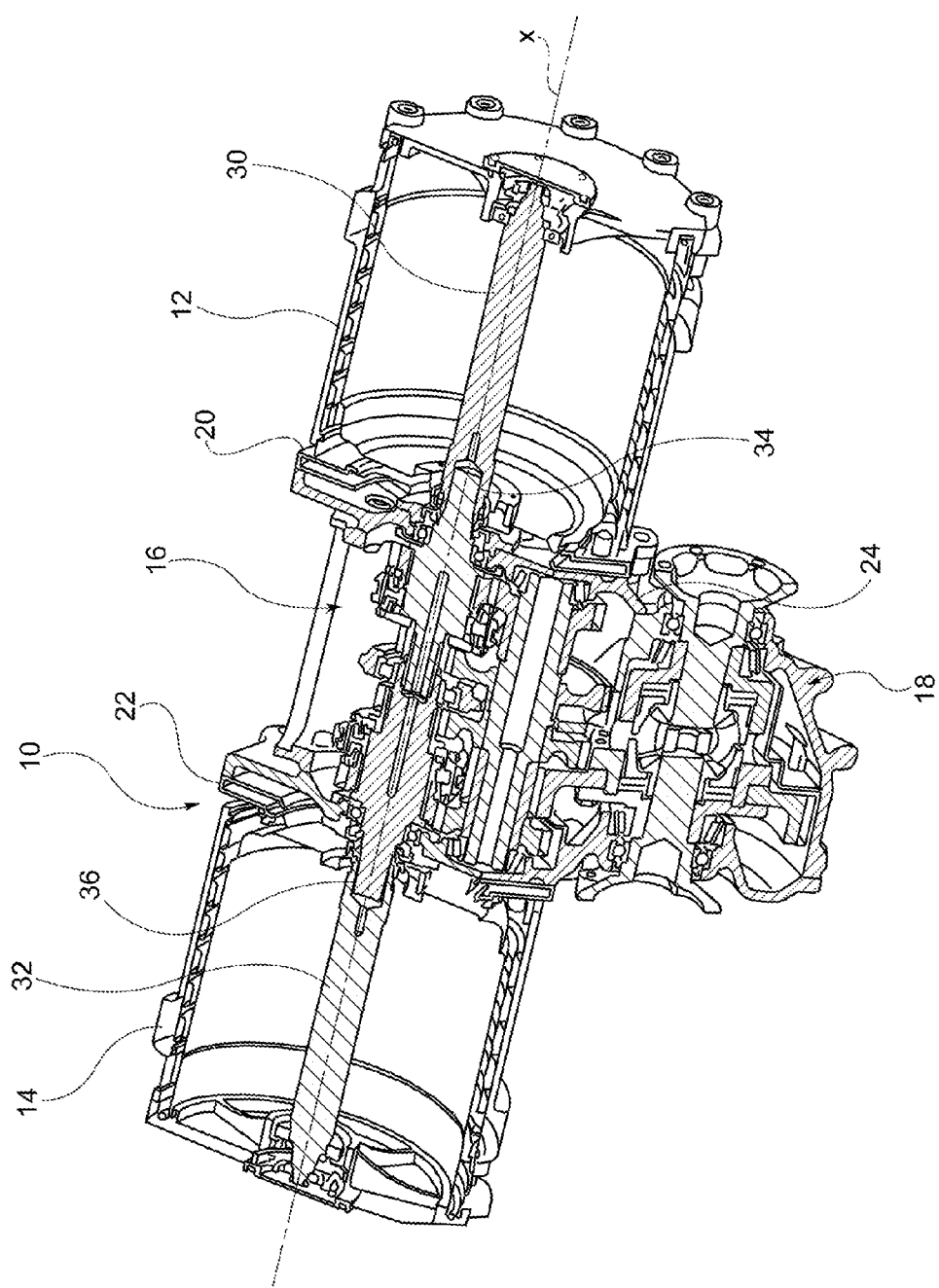
FIG. 2 is a cutaway perspective view of the electric propulsion system for vehicles of FIG. 1.

With reference first to FIGS. 1 and 2, an electric propulsion system for vehicles according to a preferred embodiment of the present invention is generally indicated 10 and basically comprises two electric motors 12 and 14, hereinafter referred to as first electric motor and second electric motor, respectively, and a gearbox 16 with at least three forward gears. In the proposed embodiment, the gearbox 16 has four forward gears, of which two are odd gears (first gear and third gear) and two are even gears (second gear and fourth gear), but might obviously have a different number (provided it is higher than or equal to three) of forward gears. Moreover, in the proposed embodiment the two electric motors 12 and 14 are coaxial to each other (the axis of the two electric motors being indicated X in FIG. 2) and are arranged on opposite sides of the gearbox 16, but might also be arranged in a way different from the one illustrated, depending on the available space on board of the vehicle. The propulsion system 10 further comprises a differential gear 18 coupled to the gearbox 16. The differential gear 18 will not be described here in detail, since on the one hand it is of per-se-known type and on the other hand its structure and function are irrelevant for the purposes of the present invention. The two electric motors 12 and 14 are attached by means of respective attachment flanges 20 and 22 to a casing 24 of the gearbox. The two electric motors 12 and 14 are also of per-se-known type and will not be therefore described in detail.

Figure 3:
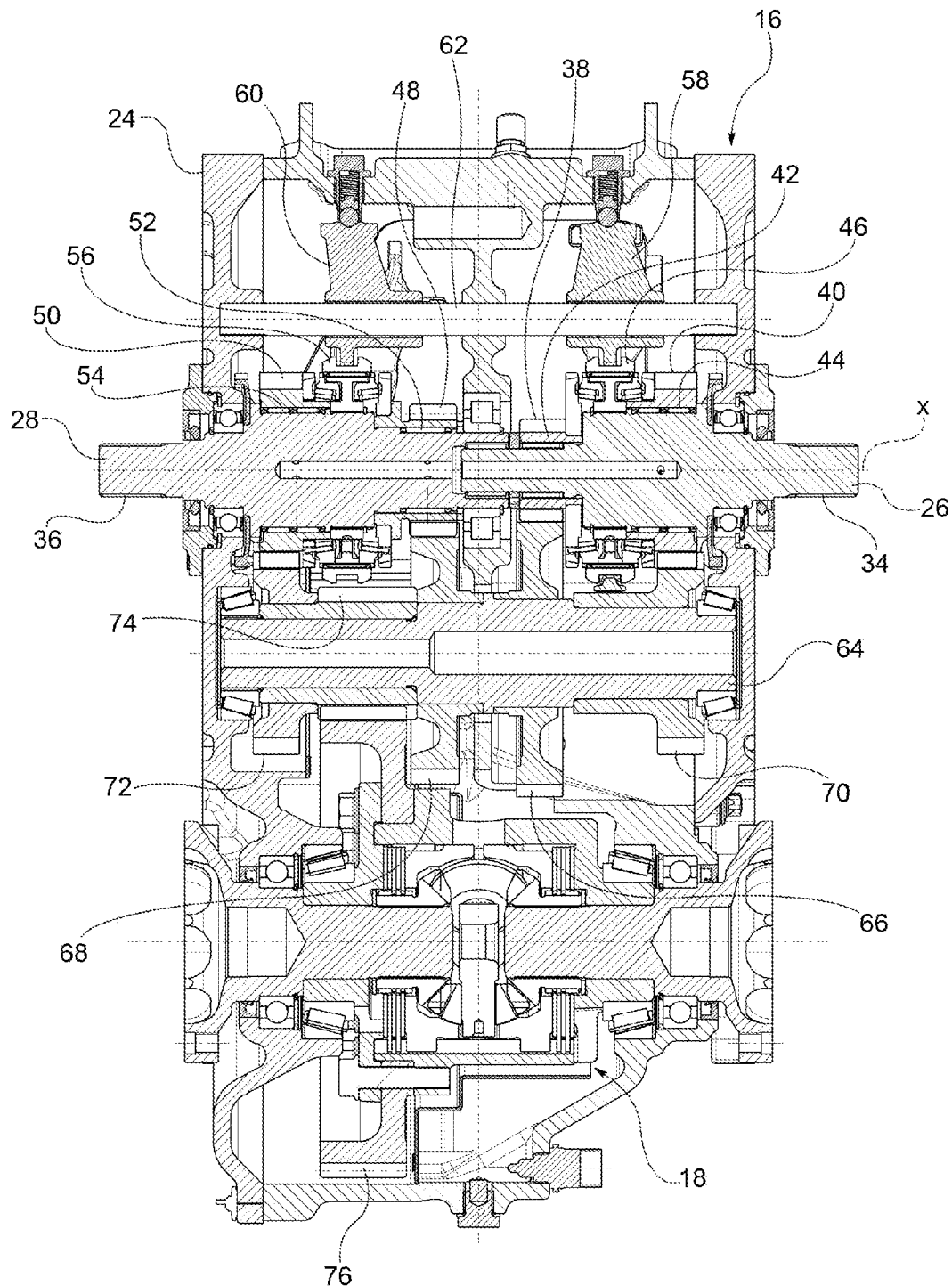
FIG. 3 is a section view of the gearbox forming part of the electric propulsion system for vehicles of FIG. 1.

With reference now to FIG. 3, the structure of the gearbox 16 will be described. The gearbox 16 comprises first of all two primary shafts 26 and 28, hereinafter referred to as first primary shaft and second primary shaft, respectively. The two primary shafts 26 and 28 are arranged coaxially to each other, the axis of the two primary shafts 26 and 28 coinciding with the axis X of the two electric motors 12 and 14. The first primary shaft 26 is permanently torsionally connected to a drive shaft 30 of the first electric motor 12. Likewise, the second primary shaft 28 is permanently torsionally connected to a drive shaft 32 of the second electric motor 14. More specifically, in the proposed embodiment the first primary shaft 26 is directly connected to the drive shaft 30 of the first electric motor 12 by means of a splined coupling 34, whereby the shaft 26 and the shaft 30 always rotate at the same angular speed. Likewise, in the proposed embodiment the second primary shaft 28 is directly connected to the drive shaft 32 of the second electric motor 14 by means of a splined coupling 36, whereby the shaft 28 and the shaft 32 always rotate at the same angular speed. No friction clutches or similar coupling devices adapted to control the transmission of the torque are therefore interposed between each primary shaft 26 or 28 and the drive shaft 30 or 32 of the respective electric motor 12 or 14.

The first primary shaft 26 is associated to the odd gears, in the present case the first gear and the third gear, whereas the second primary shaft 28 is associated to the even gears, in the present case the second gear and the fourth gear. The first primary shaft 26 carries a pair of gearwheels 38 and 40 acting as driving gearwheels for the gear sets of first gear and of third gear, respectively. The gearwheels 38 and 40 are idly mounted on the first primary shaft 26, for instance by means of respective needle bearings 42 and 44, and are selectively connectable for rotation with this shaft by means of an engagement sleeve 46 of per-se-known type. Likewise, the second primary shaft 28 carries a pair of gearwheels 48 and 50 acting as driving gearwheels for the gear sets of second gear and of fourth gear, respectively. The gearwheels 48 and 50 are idly mounted on the second primary shaft 28, for instance by means of respective needle bearings 52 and 54, and are selectively connectable for rotation with this shaft by means of an engagement sleeve 56 of per-se-known type. The engagement sleeves 46 and 56 are operated by respective shift forks 58 and 60 which are slidably mounted along a rod 62 supported by the casing 24 of the gearbox and which are in turn operated by means of a gear shift control device (per-se-known and not shown) of electro-mechanical or electro-hydraulic type.

The gearbox 16 further comprises a secondary shaft 64 which is supported for rotation by the casing 24 and extends parallel to and spaced from the two primary shafts 26 and 28. The secondary shaft 64 carries four gearwheels acting as driven gearwheels for the gear sets associated to the various gears of the gearbox, namely a gearwheel 66 permanently meshing with the gearwheel 48 carried by the first primary shaft 26 to form the gear set of first gear, a gearwheel 68 permanently meshing with the gearwheel 58 carried by the second primary shaft 28 to form the gear set of second gear, a gearwheel 70 permanently meshing with the gearwheel 50 carried by the first primary shaft 26 to form the gear set of third gear and a gearwheel 72 permanently meshing with the gearwheel 60 carried by the second primary shaft 28 to form the gear set of fourth gear. The gearwheels 66, 68, 70 and 72 are all made as fixed gearwheels, i.e. as gearwheels drivingly connected for rotation with the secondary shaft 64. The secondary shaft 64 also carries an output pinion 74 which is also made as a fixed gearwheel and permanently meshes with an input gearwheel 76 of the differential gear 18.

The propulsion system 10 further comprises an electronic control unit (not shown) arranged to control the two electric motors 12 and 14 and the gear shift control device, as well as, through this latter, the engagement sleeves 46 and 56, according to operating modes which will be briefly illustrated here below.

The propulsion system 10 is arranged to normally transmit torque to the secondary shaft 64 of the gearbox 16, and hence to the differential gear 18, by means of both the electric motors 12 and 14, whereby the torque transmitted to the secondary shaft is equal to the sum of the torque inputs provided by both the electric motors.

In a first operating mode of the electric propulsion system according to the invention, the first gear and the second gear are engaged at the same time. In this operating mode, therefore, the engagement sleeve 46 associated to the odd gears will be positioned in such a manner as to connect the driving gearwheel of first gear 38 for rotation with the first primary shaft 26, whereas the engagement sleeve 56 associated to the even gears will be positioned in such a manner that it connects the driving gearwheel of second gear 48 for rotation with the second primary shaft 28. Moreover, the two electric motors 12 and 14 will be suitably controlled by the electronic control unit in such a manner that the angular speeds of the driven gearwheel of first gear 66 and of the driven gearwheel of second gear 68, which are both drivingly connected for rotation with the secondary shaft 64, are equal to each other. Since the angular speed of the driven gearwheel of first gear 66 is equal to the angular speed of the first primary shaft 26, i.e. of the drive shaft 30 of the first electric motor 12, multiplied by the transmission ratio of first gear and the angular speed of the driven gearwheel of second gear 68 is equal to the angular speed of the second primary shaft 28, i.e. of the drive shaft 32 of the second electric motor 14, multiplied by the transmission ratio of second gear, the two electric motors 12 and 14 shall be set into rotation with angular speeds such that the ratio of the angular speed of the first electric motor 12 to the angular speed of the second electric motor 14 is equal to the ratio of the transmission ratio of second gear to the transmission ratio of first gear. In this operating mode, therefore, the speeds of the two electric motors 12 and 14 will be varied by the electronic control unit depending on the commands given by the driver, but will always stay in the above-defined ratio.

In a second operating mode of the electric propulsion system according to the invention, the second gear and the third gear are engaged at the same time. In this operating mode, therefore, the engagement sleeve 46 associated to the odd gears will be positioned in such a manner that it connects the driving gearwheel of third gear 40 for rotation with the first primary shaft 26, whereas the engagement sleeve 56 associated to the even gears will be positioned in such a manner that is connects the driving gearwheel of second gear 48 for rotation with the second primary shaft 28. Also in this case the two electric motors 12 and 14 will be suitably controlled by the electronic control unit in such a manner that the angular speeds of the driven gearwheel of second gear 68 and of the driven gearwheel of third gear 70, which are both drivingly connected for rotation with the secondary shaft 64, are equal to each other. On the base of the same observations as those submitted above in connection with the first operating mode, the two electric motors 12 and 14 shall be set into rotation under the control of the electronic control unit in such a manner that the ratio of the angular speed of the first electric motor 12 to the angular speed of the second electric motor 14 is constantly equal to the ratio of the transmission ratio of second gear to the transmission ratio of third gear.

In a third operating mode of the electric propulsion system according to the invention, the third gear and the fourth gear are engaged at the same time. In this operating mode, therefore, the engagement sleeve 46 associated to the odd gears will be positioned in such a manner that it connects the driving gearwheel of third gear 40 for rotation with the first primary shaft 26, whereas the engagement sleeve 56 associated to the even gears will be positioned in such a manner that it connects the driving gearwheel of fourth gear 50 for rotation with the second primary shaft 28. Also in this case the two electric motors 12 and 14 will be suitably controlled by the electronic control unit in such a manner that the angular speeds of the driven gearwheel of third gear 70 and of the driven gearwheel of fourth gear 72, which are both drivingly connected for rotation with the secondary shaft 64, are equal to each other. On the base of the same observations as those submitted above in connection with the first and the second operating mode, the two electric motors 12 and 14 shall be set into in rotation under the control of the electronic control unit in such a manner that the ratio of the angular speed of the first electric motor 12 to the angular speed of the second electric motor 14 is constantly equal to the ratio of the transmission ratio of third gear to the transmission ratio of fourth gear.

Naturally, in case of a propulsion system comprising a gearbox with more than four forward gears one or more additional operating modes will be provided for, in which pairs of consecutive gears, starting from the fourth gear, will be engaged at the same time.

When shifting from an operating mode to the immediately consecutive one, one of the two gears remains engaged. Naturally, this is the highest of the two gears which are engaged at the same time in the initial operating mode, or the lowest of the two gears which are engaged at the same time in the final operating mode. With reference to the above-described operating modes, when shifting from the first to the second operating mode described above, the second gear (associated to the second electric motor 14) will remain engaged and the gear associated to the first electric motor 12 shall be changed, whereas when shifting from the second to the third operating mode the third gear (associated to the first electric motor 12) will remain engaged and the gear associated to the second electric motor 14 shall be changed. During the shift from an operating mode to the following one, the angular speed of the secondary shaft, and hence the speed of the vehicle, is determined by the angular speed of the electric motor associated to the gear which remains engaged, whereas the angular speed of the electric motor must be suitably varied (reduced) so as to be adapted to the transmission ratio of the new gear (the third gear, instead of the first one, in case of shift from the first to the second operating mode or the fourth gear, instead of the second one, in case of shift from the second to the third operating mode). Moreover, when shifting from an operating mode to the following one the electronic control unit shall control the electric motor associated to the gear being changed so as not to transmit torque, in order to allow the old gear to be disengaged and the new gear to be engaged, whereas it shall increase the torque supplied by the other electric motor, i.e. by the electric motor associated to the gear which remains engaged, in order to compensate for the loss of torque of the other electric motor and thus ensure that the torque available at the wheels remains unchanged.

Naturally, the principle of the invention remaining unchanged, the embodiments and the constructional details may vary widely from those described and illustrated purely by way of non-limiting example, without thereby departing from the scope of the invention as defined in the appended claims.

For instance, the control logics of the electric motors and of the gear shift control device implemented by the electronic control unit may vary from those briefly explained above, without thereby departing from the basic idea of the invention to provide an electric propulsion system with a gearbox comprising two primary shafts each of which is permanently torsionally connected with a respective electric motor.

What is claimed is:

1. An electric propulsion system for vehicles, comprising a first and a second electric motor, a gearbox with at least three forward gears and a control unit arranged to control the first and the second electric motor and to control the engagement of the gears of the gearbox, wherein the gearbox comprises a first primary shaft associated to odd gears and is permanently torsionally connected to the first electric motor and a second primary shaft associated to even gear(s) and is permanently torsionally connected to the second electric motor, and the control unit is arranged to control the first and the second electric motor and to control the engagement of the gears of the gearbox to provide at least a first operating mode in which the first gear and the second gear are engaged at the same time and a second operating mode in which the second gear and the third gear are engaged at the same time, in each of said operating modes the torque being transmitted both by the first electric motor and the second electric motor through the first primary shaft and the second primary shaft, respectively.

2. Propulsion system according to claim 1, wherein the gearbox has four forward gears, of which the first gear and the third gear are associated to the first primary shaft, while the second gear and the fourth gear are associated to the second primary shaft.

3. Propulsion system according to claim 1, wherein the first and the second electric motor are coaxial to one another and are arranged on opposite sides of the gearbox.

4. Propulsion system according to claim 1, wherein the first and the second primary shaft are coaxial to one another.

5. Propulsion system according to claim 3, wherein the two primary shafts are coaxial to the two electric motors.

6. Propulsion system according to claim 1, wherein each of said first primary shaft and second primary shaft carries, for each gear associated thereto, a driving gearwheel idly mounted on the shaft.

7. Propulsion system according to claim 1, wherein the gearbox further comprises a secondary shaft arranged parallel to the first and the second primary shaft and carrying, for each gear of the gearbox, a driven gearwheel drivingly connected for rotation with the shaft and permanently meshes with a respective driving gearwheel.

\* \* \* \* \*